US012409662B2

(12) United States Patent
Burke

(10) Patent No.: US 12,409,662 B2
(45) Date of Patent: *Sep. 9, 2025

(54) INKJET MODULE WITH PIVOTING CAP COVER

(71) Applicant: Memjet Technology Limited, Dublin (IE)

(72) Inventor: David Oliver Burke, North Ryde (AU)

(73) Assignee: Memjet Technology Limited, Dublin (IE)

( * ) Notice: Subject to any disclaimer, the term of this patent is extended or adjusted under 35 U.S.C. 154(b) by 262 days.

This patent is subject to a terminal disclaimer.

(21) Appl. No.: 18/309,299

(22) Filed: Apr. 28, 2023

(65) Prior Publication Data

US 2023/0391087 A1 Dec. 7, 2023

Related U.S. Application Data

(60) Provisional application No. 63/476,671, filed on Dec. 22, 2022, provisional application No. 63/377,240, filed on Sep. 27, 2022, provisional application No. 63/348,445, filed on Jun. 2, 2022, provisional application No. 63/348,449, filed on Jun. 2, 2022.

(51) Int. Cl.

| | |
|---|---|
| ***B41J 2/175*** | (2006.01) |
| ***B41J 2/165*** | (2006.01) |
| ***B41J 2/265*** | (2006.01) |
| ***B41J 25/304*** | (2006.01) |
| ***B41J 25/34*** | (2006.01) |

(52) U.S. Cl.

CPC ......... *B41J 2/1752* (2013.01); *B41J 2/16508* (2013.01); *B41J 2/16535* (2013.01); *B41J 25/304* (2013.01); *B41J 25/34* (2013.01)

(58) Field of Classification Search

CPC .. B41J 2/1752; B41J 2/16508; B41J 2/16535; B41J 25/304; B41J 25/34

See application file for complete search history.

(56) References Cited

U.S. PATENT DOCUMENTS

2016/0009111 A1* 1/2016 Li ........................ B41J 2/16585 347/29

2023/0391120 A1* 12/2023 Burke .................... B41J 2/1652

* cited by examiner

*Primary Examiner* — Geoffrey S Mruk

(74) *Attorney, Agent, or Firm* — Garson & Gutierrez, PC

(57) ABSTRACT

An integrated inkjet module includes: a chassis having an elongate base plate and a rear wall extending upwards therefrom; an elongate printhead liftably mounted on the chassis; a lift mechanism operatively connected to the printhead for lifting and lowering the printhead relative to the base plate; a capping assembly slidably mounted on the base plate, the capping assembly having a capper extending parallel with the rear wall and the printhead; a capper movement mechanism operatively connected to the capping assembly for linearly slidably moving the capping assembly towards and away from the rear wall; and a cap cover pivotally mounted to the rear wall. During use, engagement of part of the capping assembly with the cap cover pivots the cap cover away from the capper to allow sliding movement of the capper towards the rear wall and into a covered position.

11 Claims, 7 Drawing Sheets

INKJET MODULE WITH PIVOTING CAP COVER

CROSS-REFERENCE TO RELATED APPLICATIONS

The present application claims the benefit of priority under 35 U.S.C. § 119(e) of U.S. Provisional Application No. 63/348,445, entitled INKJET MODULE WITH PRINTHEAD NEST ASSEMBLY, filed Jun. 2, 2022; U.S. Provisional Application No. 63/348,449, entitled PRINTING UNIT WITH TANDEM INKJET MODULES, filed Jun. 2, 2022; U.S. Provisional Application No. 63/377,240, entitled PRINTING UNIT WITH TANDEM INKJET MODULES, filed Sep. 27, 2022; and U.S. Provisional Application No. 63/476,671, entitled PRINTING UNIT WITH TANDEM INKJET MODULES, filed Dec. 22, 2022, the contents of each of which are hereby incorporated by reference in their entirety for all purposes.

The present application is related to U.S. application Ser. No. 18/308,971, entitled INK DELIVERY SYSTEM WITH FILTER PROTECTION, filed on Apr. 28, 2023, the contents of which is hereby incorporated by reference in its entirety for all purposes.

FIELD OF THE INVENTION

This invention relates to inkjet modules for use in modular single pass print systems. It has been developed primarily for facilitating printhead replacement in a robust inkjet module, whilst ensuring secure datuming of the printhead.

BACKGROUND OF THE INVENTION

Inkjet printers employing Memjet® page wide technology are commercially available for a number of different printing applications, including desktop printers, digital inkjet presses and wide format printers. Memjet® printers typically comprise one or more stationary inkjet printhead cartridges having a length of at least 200 mm, which are user replaceable. For example, a desktop label printer comprises a single user-replaceable multi-colored printhead cartridge, a high-speed inkjet press comprises a plurality of user-replaceable monochrome printhead cartridges aligned along a media feed direction, and a wide format printer comprises a plurality of user-replaceable printhead cartridges in a staggered overlapping arrangement so as to span across a wide format page width.

Analogue printing presses are conventionally used for relatively long print runs in which the cost of producing dedicated printing plates is economically feasible. Increasingly, industrial print systems use single-pass digital inkjet printing for relatively shorter print runs. Digital inkjet printing avoids the high set-up costs of producing printing plates and allows each print job to be tailored to a particular customer. Desirably, web feed systems for existing analogue print systems should be adaptable so as to enable 'drop-in' inkjet modules in place of, for example, offset printing stations. It is therefore desirable for inkjet modules to occupy minimal space with respect to a media feed direction, whilst allowing full color printing at high speeds with optimum print quality.

Inkjet printheads need to be replaced periodically and it would be desirable to enable printhead replacement with a high degree of reliability and accuracy so as to minimize alignment errors, especially in print systems having a plurality of printheads aligned along a media path. It would further be desirable to protect sensitive electronics, delivering power and data to the printhead, from ink mist during printing.

U.S. Pat. No. 10,293,609 describes a full color page wide printhead having two rows of chips receiving ink from a common manifold.

U.S. Pat. No. 10,967,638 describes a print module having a pivotable printhead carrier for printhead removal and replacement via sliding longitudinal insertion of the printhead through an access opening at one end of the printhead carrier.

U.S. Pat. No. 10,647,137 (the contents of which are incorporated herein by reference) describes a print module which is liftable upwards from a sleeve for printhead removal and replacement.

SUMMARY OF THE INVENTION

In one aspect, there is provided an integrated inkjet module comprising:

- a chassis comprising an elongate base plate and a rear wall extending upwards therefrom;
- an elongate printhead liftably mounted on the chassis;
- a lift mechanism operatively connected to the printhead for lifting and lowering the printhead relative to the base plate;
- a capping assembly slidably mounted on the base plate, the capping assembly comprising a capper extending parallel with the rear wall and the printhead;
- a capper movement mechanism operatively connected to the capping assembly for linearly slidably moving the capping assembly towards and away from the rear wall; and
- a cap cover pivotally mounted to the rear wall, wherein:

- the capping assembly is slidably movable between a capping position in which the capper caps the printhead and a covered position in which the cap cover covers the capper; and
- engagement of part of the capping assembly with the cap cover pivots the cap cover away from the capper to allow sliding movement of the capper towards the rear wall and into the covered position.

Inkjet printheads need to be capped during non-printing periods to prevent nozzles from drying out and becoming unusable. Perimeter cappers provide a seal around the printhead so as maintain a humid environment over the nozzles and minimize dehydration. Ideally, cappers should not introduce relatively dry air over the nozzles during capping to maximize nozzle hydration. Therefore, cap covers are employed in some printing systems to maintain a humid environment in the capper when it is not being used to cap the printhead. The inkjet module described above, incorporating the pivoting cap cover, enables the capper to be covered when not in use and without requiring a separately powered mechanism to move the cap cover relative to the capper.

As used herein, the term "inkjet module" is taken to mean an assembly of components, which includes an inkjet printhead, such as an elongate printhead configured for single-pass printing (known in the art as a "page wide" or "line head" printhead). The inkjet module typically also includes maintenance components and/or ink delivery components to provide a fully integrated inkjet system. The inkjet module may itself be a component of a modular print system, which may comprise, for example, a plurality of inkjet modules. Inkjet modules may be, for example, aligned along a media feed direction for very high-speed printing, or a plurality of inkjet modules may be positioned in a staggered overlapping arrangement across a media feed path for wide-format printing.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids, solar inks, and the like.

As used herein, the term "mounted" includes both direct mounting and indirect mounting via an intervening part.

BRIEF DESCRIPTION OF THE DRAWINGS

Specific embodiments of the present invention will now be described by way of example only with reference to the accompanying drawings, in which.

DETAILED DESCRIPTION OF THE INVENTION

Figure 1:
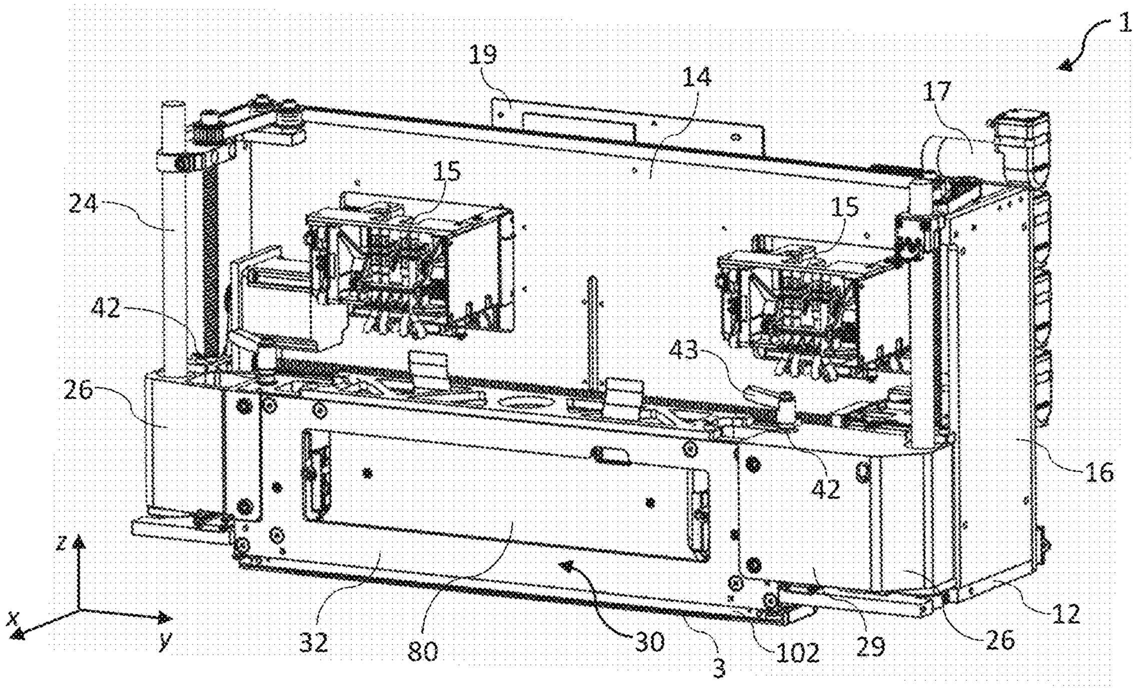
FIG. 1 is a top front perspective of an inkjet module in a printhead lowered position.
Figure 2:
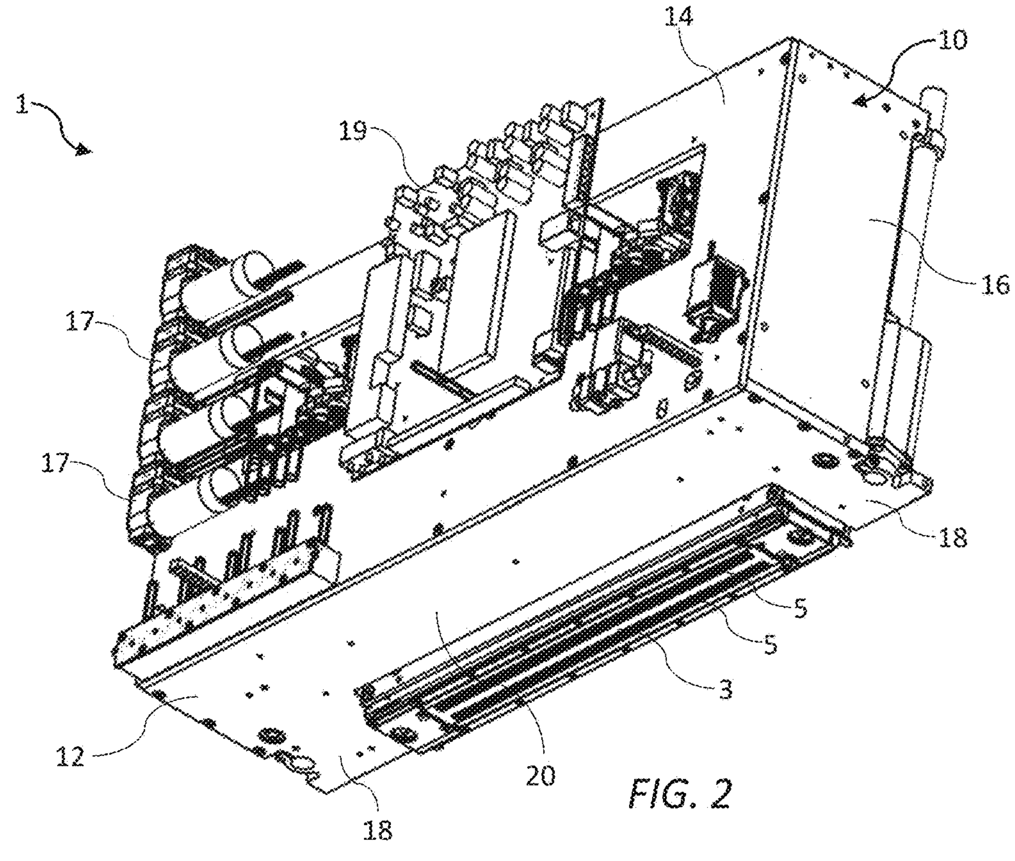
FIG. 2 is a bottom rear perspective of the inkjet module shown in FIG. 1.

FIGS. 1 to 7 show an integrated inkjet module 1 suitable for use in industrial printing systems. The inkjet module 1 is a self-contained unit comprising an elongate printhead 3 configured for single-pass printing, as well as requisite components for capping, wiping and delivering ink, power and data to the printhead in a compact, fully integrated assembly. The printhead 3 contains two rows of butting print chips 5 mounted on a singular uniform ink manifold, as described in U.S. Pat. Nos. 10,293,609 and 10,967,638, the contents of which are incorporated herein by reference.

The inkjet module 1 may be used singly or as a modular component of a single-pass printing system comprising a plurality of such inkjet modules. For example, inkjet modules may be fully aligned in a stacked arrangement along a media feed path, or positioned in a staggered overlapping arrangement across a wider media feed path. Hence, the integrated inkjet module 1 allows facile construction of single-pass printing systems in a versatile and scalable manner. By way of example only, Applicant's co-filed U.S. application Ser. No. 18/309,328 entitled "PRINTING UNIT WITH TANDEM INKJET MODULES" describes a high-speed industrial printing unit incorporating an opposing pair of such inkjet modules 1.

The inkjet module 1 comprises a chassis 10 having an elongate base plate 12 with a rear wall 14 and a pair of opposite end walls 16 extending upwards from the base plate. Aside from providing the chassis 10 with structural rigidity, the rear wall 14 also serves as a support for mounting various fluidic components (e.g. pinch valves 15 and pumps 17) and electronic components (e.g. module controller PCB 19) on both its front and rear faces. Openings in the rear wall 14 allow fluidic connections from the rear face of the inkjet module 1, without requiring overhead access.

The base plate 12 is generally C-shaped in plan view having a pair of transverse arms 18 extending from opposite ends of a longitudinal base member 20 along a nominal x-axis of the inkjet module 1. An open longitudinal slot 22 is defined between the transverse arms 18 at a front side of the inkjet module 1. The open longitudinal slot 22 extends parallel with a longitudinal axis along a nominal y-axis of the inkjet module 1 and is configured for receiving the elongate printhead 3. Thus, the printhead 3 is asymmetrically positioned in the inkjet module 1 towards a front side thereof, allowing proximal positioning of printheads from oppositely oriented inkjet modules. The printhead 3 may be either lowered through the slot 22 for printing or raised above the base plate 12 for maintenance (e.g., capping and/or wiping).

A pair of posts 24 extend upwards from the transverse arms 18 of the base plate 12 at opposite ends of the open longitudinal slot 22. Each post 24 is anchored to the base plate 12 at a lower end thereof and secured to a respective end wall 16 at an upper end thereof. A pair of brackets 26 are slidably engaged with the posts 24 via respective sleeve bushings 28 inserted in each bracket. Each sleeve bushing 28 is slidably movable relative to a respective post 24 allowing vertical linear movement of the brackets 26 towards and away from the base plate 12 along a nominal z-axis of the inkjet module 1. A flanged portion 29 at a lower end of each sleeve bushing 28 is fastened to each bracket 26 and datums its respective bracket against the base plate 12 in the printhead lowered position (FIG. 1).

Figure 5:
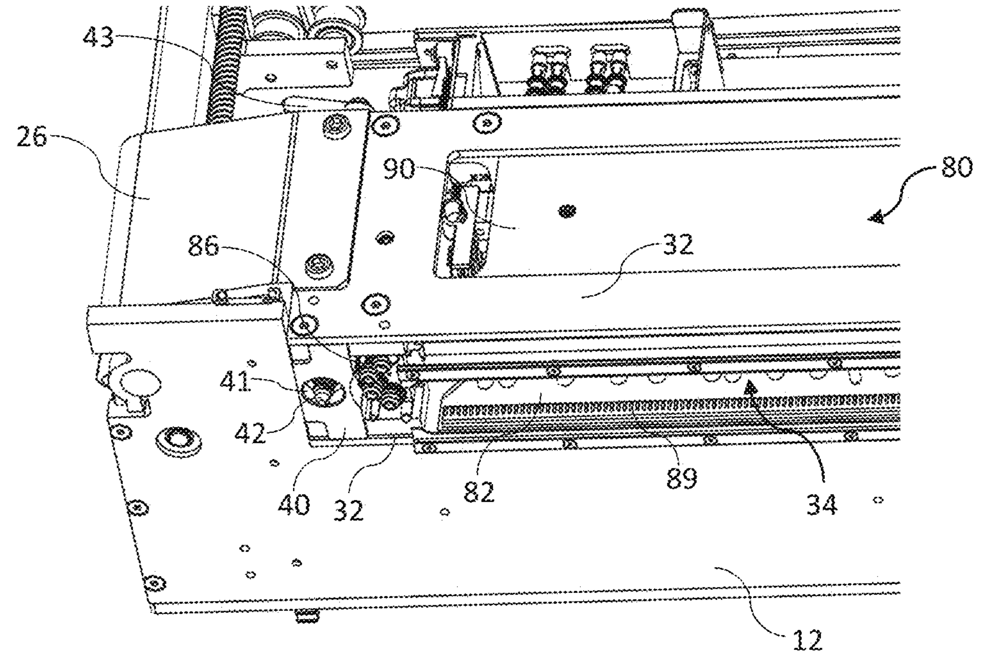
FIG. 5 shows part of a printhead carrier with a printhead nest assembly removed.

An elongate printhead carrier 30 is fixedly supported between the brackets 26 and is linearly slidably movable with the brackets. The printhead carrier 30 comprises spaced apart front and rear carrier plates 32 interconnecting the brackets 26 and defining a cavity 34 therebetween for housing electronic components supplying power and data to the printhead 3. A brace 38 interconnects upper parts of the carrier plates 32, while a pair of datum blocks 40 interconnect lower parts of the carrier plates. The datum blocks 40 are positioned at opposite longitudinal ends of the printhead carrier 30 towards respective brackets 26. The braced printhead carrier 30, in combination with the sleeve bushings 28, posts 24 and chassis 10 provide a robust support structure for the printhead 3. The printhead 3 is itself secured within a complementary nest 102 to form a printhead nest assembly 100 (see FIG. 9), which is mounted to the datum blocks 40 via screw fasteners 42 engaged with the nest. As shown in FIG. 5, the datum blocks 40 have a width dimension (along the nominal x-axis), which is greater than a width dimension of the printhead 3 and commensurate with a width dimension of the nest 102. Therefore, the datum blocks 40, in combination with the nest 102, enable robust and accurate datuming of the printhead 3 relative to the printhead carrier 30 while still enabling removal and replacement of the printhead from the nest.

Figure 6:
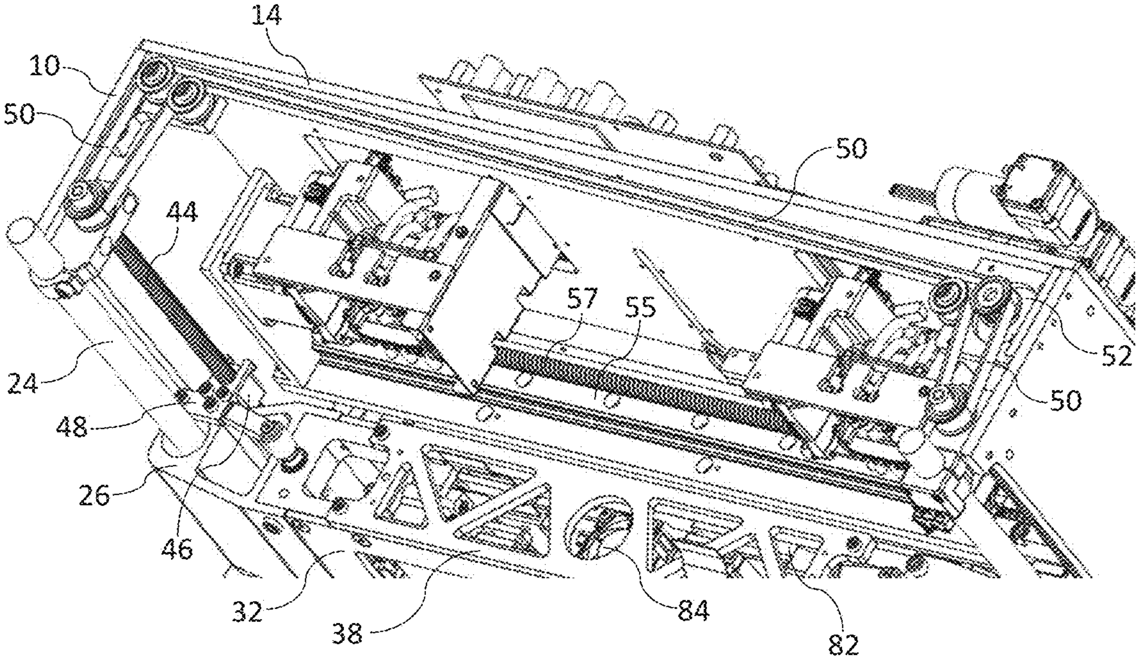
FIG. 6 is a top perspective of the inkjet module showing the lift mechanism.
Figure 7:
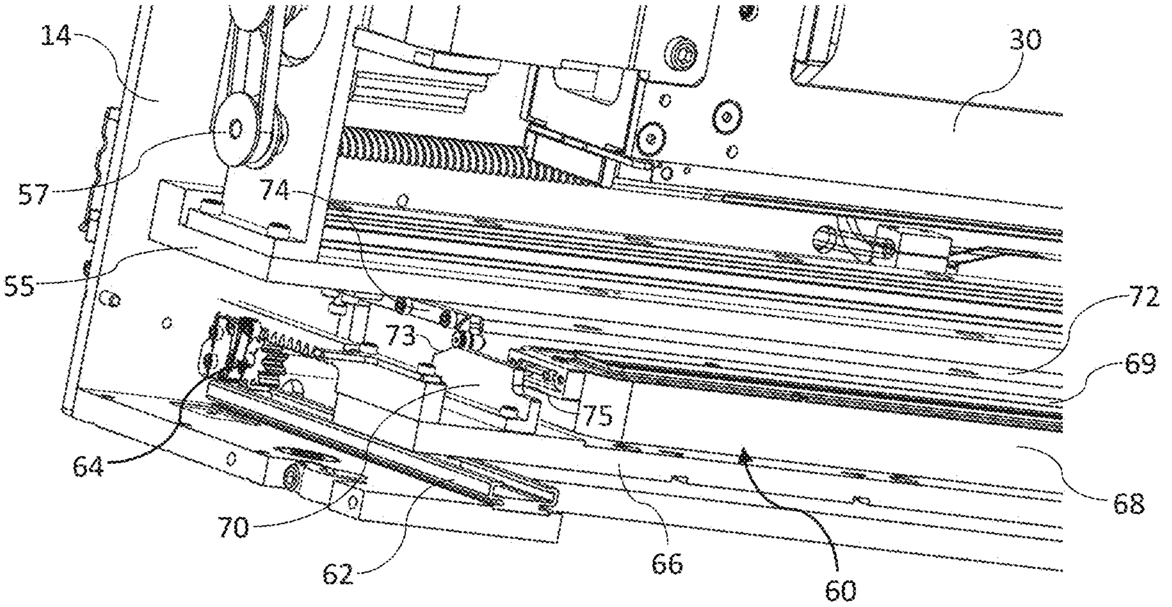
FIG. 7 shows the inkjet module with an end wall removed to reveal a capping assembly and cap cover.

The printhead 3 is linearly slidably movable towards and away from the base plate 12 between a printing position (FIG. 1) and a maintenance position (FIG. 3) by means of a lift mechanism operatively connected to each bracket 26. As best shown in FIG. 6, the lift mechanism comprises a pair of lead screws 44 rotatably mounted to the base plate 12 and extending upwards parallel with the posts 24. Each lead screw 44 has respective lead nut 46 fixedly connected to a respective bracket via a lead nut connector 48. The lead screws 44 are rotatable by means of an interconnecting pulley belt assembly operatively 50 connected to a common lift motor 52. Accordingly, the printhead 3 may be moved between raised and lowered positions by actuation of the lift motor 52, which rotates the leads screws 44 simultaneously via the pulley belt assembly 50, thereby lifting or lowering the printhead carrier 30 connected to the lead nuts 46 via the brackets 26.

Figure 3:
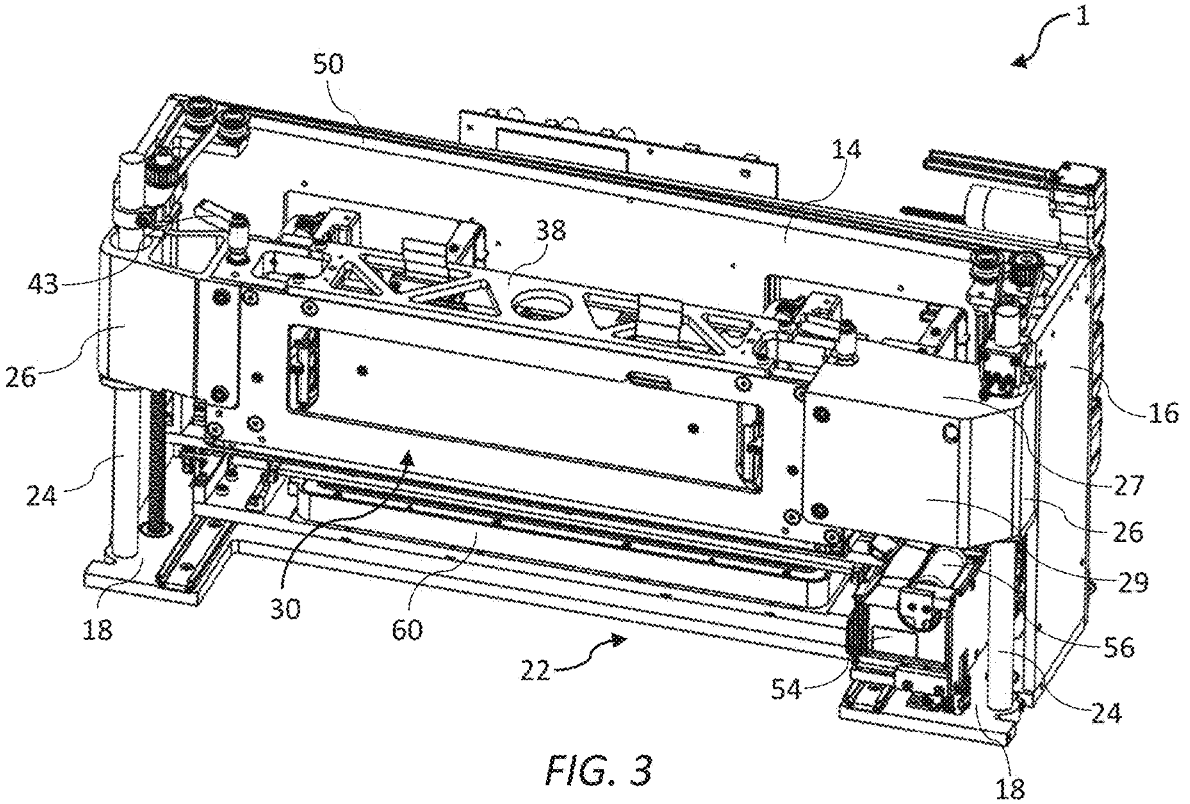
FIG. 3 is a top front perspective the inkjet module is a printhead raised position.
Figure 4:
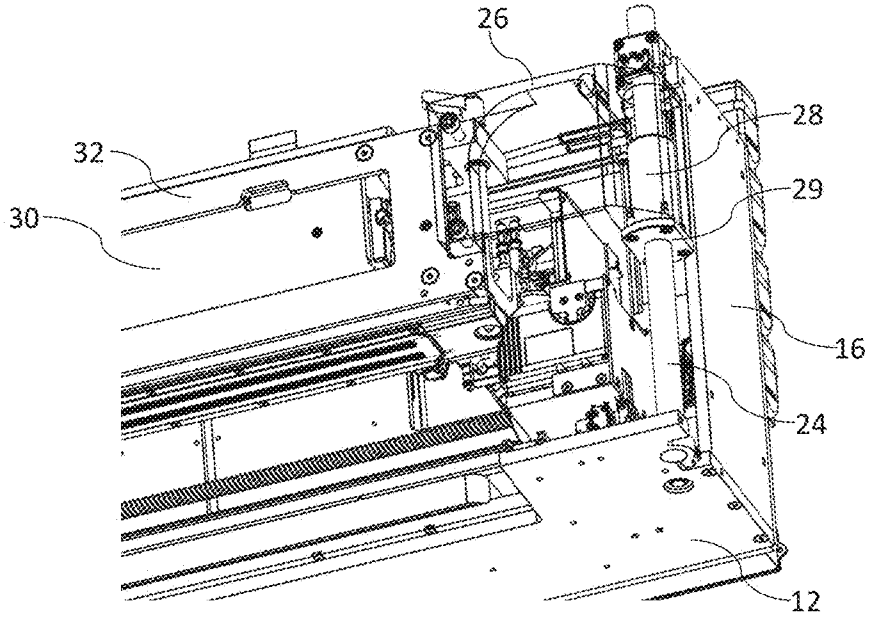
FIG. 4 is a perspective of part of the inkjet module with a bracket shown in transparency to reveal a sleeve bushing.

As best shown in FIG. 3, the inkjet module 1 comprises a wiper carriage 54, having a microfiber wiping web 56, parked at one end of the longitudinal slot 22. In the printhead raised position, the wiper carriage 54 is movable longitudinally along the length of printhead 3 by means of a wiper movement mechanism 57 mounted on a longitudinal wiper support 55 in order to wipe ink and debris from the printhead face. In the printhead lowered position (FIG. 1), one of the brackets 26, having a bracket roof 27 and bracket sidewalls 29, shields the wiper carriage 54. Thus, the bracket roof 27 and bracket sidewalls 29 provide at least some protection from ink mist and/or debris that may contaminate the wiper carriage 54 via an open front face of the inkjet module 1 during printing.

The inkjet module 1 further comprises a capping assembly 60 which is parked towards the rear wall 14 and linearly slidably movable towards and away from the printhead 3 along transverse capper rails 62 by means of rack-and-pinion mechanism 64. The capping assembly comprises 60 a capper base 66 slidably engaged with the capper rails 62, a perimeter printhead capper 68 mounted on the capper base, and cam guides 70 mounted fast with the capper base at opposite ends of the printhead capper. In its parked (covered) position shown in FIG. 3, the printhead capper 68 is covered with a cap cover 72 pivotally mounted to the rear wall 14 of the chassis 10. The cap cover 72 takes the form of a rigid plate, which seals against a perimeter seal 69 of the printhead capper 68 and maintains a humid environment within the printhead capper whenever the printhead capper is not being used for capping the printhead 3. The wiper movement mechanism 57 is mounted on the wiper support 55, which is fixedly attached to the rear wall 14 directly above the cap cover 72.

For printhead capping, the capping assembly 60 is laterally moved away from the cap cover 72 into alignment with the printhead 3, and the printhead is gently lowered onto the printhead capper 68 into a capped position using the lift mechanism. With the printhead raised, transverse movement of the capping assembly 60 back towards the rear wall 14 engages a rear cam surface 73 of the cam guides 70 with an engagement node 77 of respective rocker arms 74 at each end of the cap cover. The rocker arms 74 are pivotally mounted to the rear wall 14 and allow the cap cover 72 to pivot upwards on engagement with the cam guides 70, thereby enabling the capping assembly 60 to slidingly traverse under the cap cover. Once the capping assembly 60 has reached its rearmost parked position, the cap cover 72 pivots back downwards, by virtue of the profile of the cam guides 70 and rocker arms 74, into the covered position in which the printhead capper 68 is covered by the cap cover.

Figure 8A:
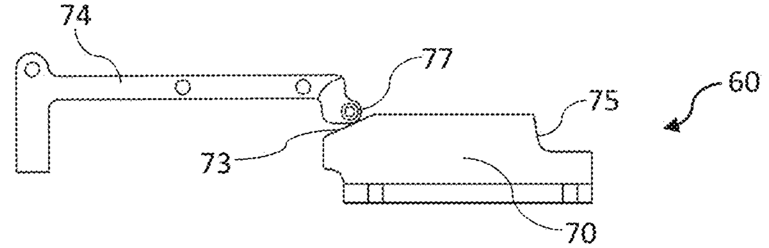
FIGS. 8A-8C are side views of engagement between a cam guide of the capping assembly with a rocker arm of the cap cover.
Figure 8B:
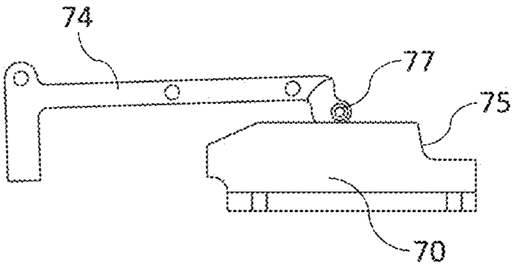
Figure 8C:
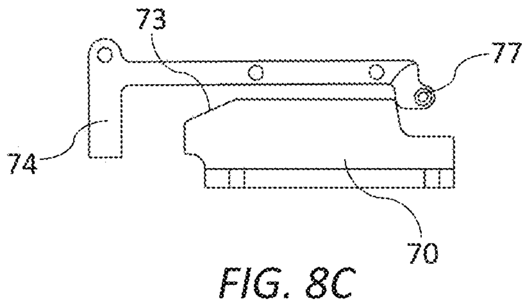

FIG. 8A shows the rear cam surface 73 of the cam guide 70 engaged with an engagement node 77 of the rocker arm 74 as the capping assembly 60 approaches the rear wall 14. FIG. 8B shows the rocker arm 73 pivoted upwards as the capping assembly transitions towards its covered position. FIG. 8C shows the capping assembly 60 in its rearmost parked position with the rocker arm 74 pivoted back into a horizontal plane and the printhead capper 68 covered by the cap cover 72. For printhead capping, the capping assembly 60 slides from its parked position shown in FIG. 8C towards the printhead 3. A front cam surface 75 of the cam guide 70 engages with the engagement node 77 of the rocker arm 74 to pivot the rocker arm upwards and allow sliding movement of the capping assembly towards the printhead 3.

As foreshadowed above, and referring now to FIGS. 5 and 6, the printhead carrier 30 defines a cavity 34 between front and rear plates 32 thereof. The cavity 34 houses a supply module 80, which includes front and rear PCBs 82 for supplying power and/or data to the printhead 3. A cooling fan 84 is positioned between the PCBs 82 for cooling electronic components with cool air drawn into the cavity 34 from an upper side of the printhead carrier 30. The brace 38, which defines a roof portion of the printhead carrier 30, has an open truss structure, which allows circulation of cool air through the cavity 34 and between the PCBs 82. The supply module 80 further comprises ink couplings 86 for engagement with complementary ink ports 88 at opposite ends of the printhead 3. The supply module 80 forms ink and electrical connections with the printhead 3 upon installation of the printhead (secured in its printhead nest assembly 100) onto the printhead carrier 30, as will be explained in more detail below.

Figure 9:
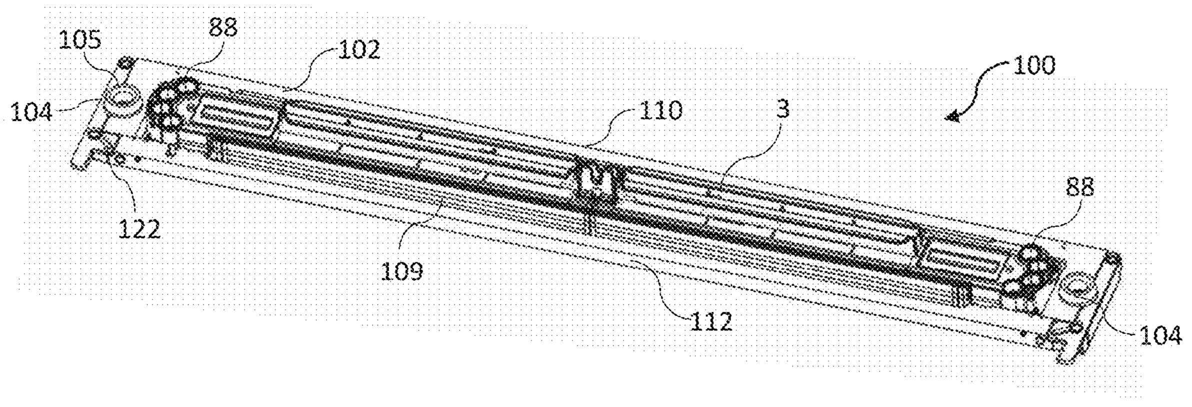
FIG. 9 is top perspective of a printhead nest assembly in a closed position.
Figure 10:
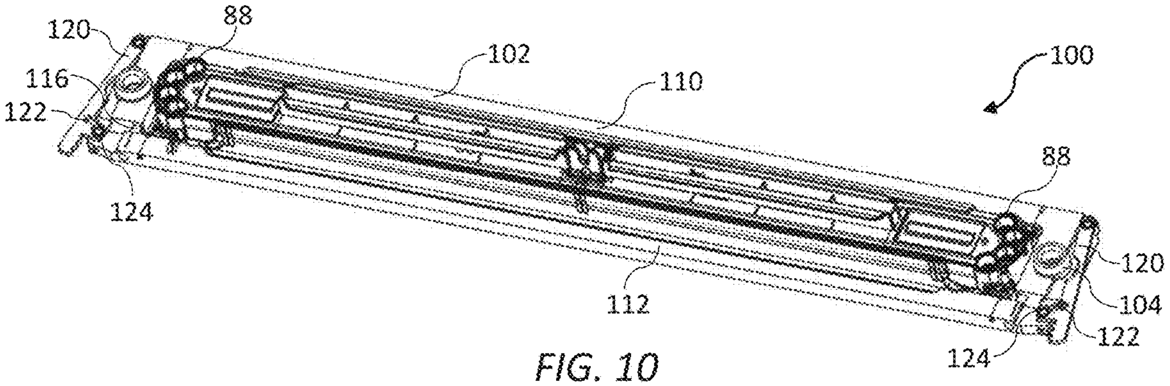
FIG. 10 is a top perspective of the printhead nest assembly in an open position.
Figure 11:
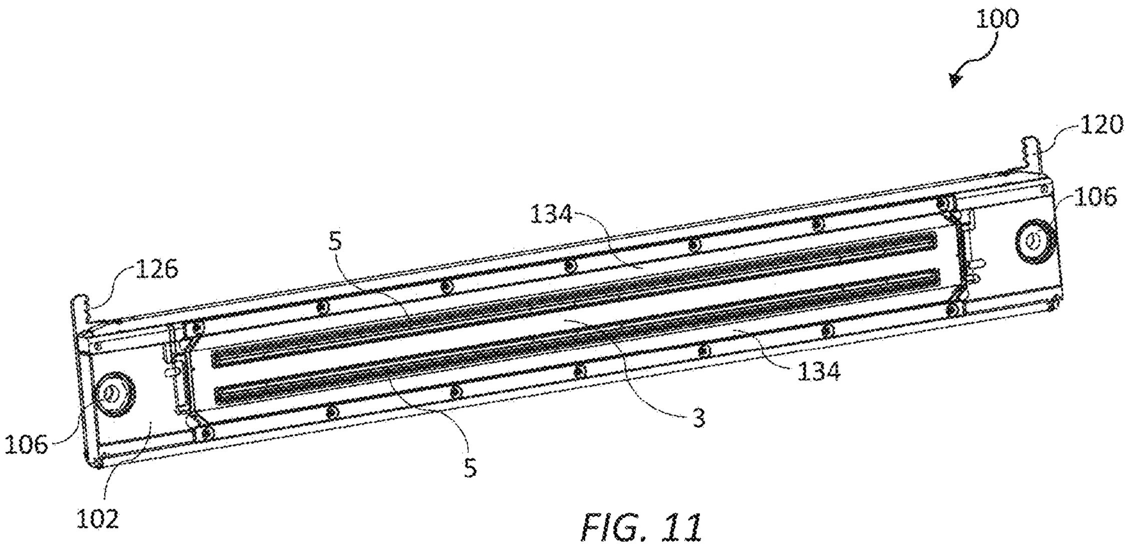
FIG. 11 is a bottom perspective of the printhead nest assembly shown in FIG. 8.

FIGS. 9 and 10 show the printhead nest assembly 100 in isolation. As shown in FIG. 9, the nest is in its closed position with the printhead 3 nestably secured within the nest 102 and enveloped about all sides by the nest. In FIG. 10, the nest 102 is in its open position, which allows removal of the printhead 3 from the nest, but only when the printhead nest assembly 100 is fully detached from the printhead carrier 30. In other words, the printhead 3 must be united with the nest 102 to form the printhead nest assembly 100 before the printhead (e.g. a replacement printhead) can be installed in the inkjet module 1 by fastening the nest 102 to the printhead carrier 30.

The nest 102 is configured for detachable fastening to the printhead carrier 30 via the pair of screw fasteners 42, which extend vertically through a height of the printhead carrier 30. Each screw fastener 42 has a screw lever 43 at one end which is user-accessible from above printhead carrier 30 and a screw tip projecting through a recessed opening 41 in a respective datum block 40 (FIG. 5). An upper surface of the nest 102 has a pair of datum pins 104 configured for complementary engagement with the recessed openings 41 of the datum blocks 40. For installation of the printhead nest assembly 100, each screw fastener 42 is screwed through a hollowed bore 105 of a respective datum pin 104 and into a threaded nut insert 106 of the nest 102. Thus, the printhead nest assembly 100 may be firmly secured to the printhead carrier 30 with accurate datuming controlled by complementary datuming engagement between the datums pins 104 and the recessed openings 41 in each datum block 40. The nest 102 enables the use of relatively large datum pins 104, separate from the printhead 3, for highly accurate and repeatable datuming between the printhead carrier 30 and the printhead nest assembly 100.

Screw fastening of the printhead nest assembly 100 to the printhead carrier 30 via the datum blocks 40 simultaneously forms ink and electrical connections between the printhead 3 and the supply module 80. Ink ports 88 at opposite ends of the printhead 3 are raised into engagement with ink connectors 86 of the supply module 80. Likewise, electrical contacts 109 extending along opposite longitudinal sides of the printhead 3 are brought into electrical contact with complementary PCB contacts 89 of respective PCBs 82 in the supply module 80. Spring-biased PCB mounting plates 90 of the supply module 80 allow the PCBs 82 to flex laterally away from each other while the printhead 3 is raised between the PCBs during installation of the printhead nest assembly 100. The spring bias provides reliable electrical connections, while the requisite insertion force (for both the ink and electrical connections) is provided by the screw fasteners 42, which are readily operable by the user using the screw levers 43. Accordingly, this arrangement obviates the movable supply assembly and two-staged ink and electrical connections, described in U.S. Pat. No. 10,967,638.

The printhead nest assembly 100 may be fastened to the printhead carrier 30 either in the printhead lowered (FIG. 1) or printhead raised position (FIG. 3), depending on whichever configuration is more accessible in a particular modular set-up of the inkjet module 1. As shown in FIG. 5, the printhead nest assembly 100 has been removed in the printhead lowered position.

Figure 13:
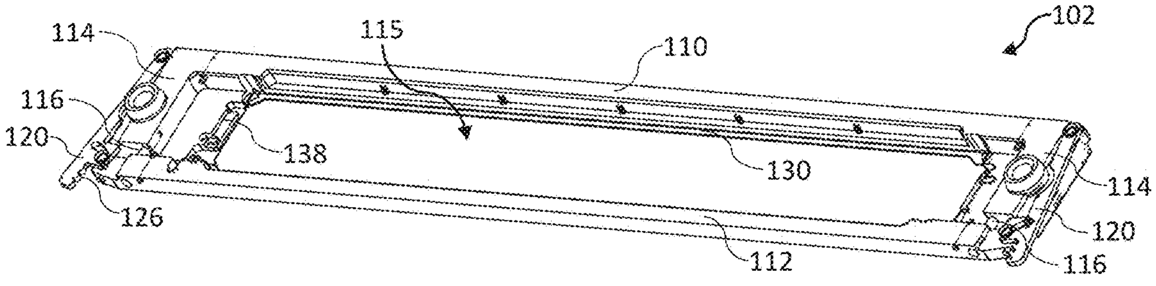
FIG. 13 shows the nest in isolation in an open position.

Referring now to FIGS. 10 and 13, the nest 102 is configurable in a nest open position for printhead removal and insertion. The nest 102 comprises first and second longitudinal side bars 110 and 112 extending parallel with opposite longitudinal sides of the printhead 3 and a pair of shorter transverse end bars 114 interconnecting each end of the longitudinal side bars to define a rectangular (oblong) nest cavity 115. The first longitudinal side bar 110 and end bars are fixed 114, while the second longitudinal side bar 112 is movable towards and away from the first longitudinal side bar between the open and closed positions.

Each end bar 114 has a dowel pin 116 received the movable second longitudinal side bar 112. Sliding movement of the second longitudinal side bar 112 relative to the fixed dowel pins 116 provides relative linear movement of the second longitudinal side bar towards and away from the first longitudinal side bar 110.

Movement of the second longitudinal side bar is 112 effected by means of a locking mechanism, which configures the nest 102 in either the closed or open positions. The locking mechanism comprises a pair of nest levers 120, each nest lever being pivotally attached to a respective end bar 114 and having a pivot axis perpendicular to a horizontal plane of the nest (i.e. parallel to a direction of droplet ejection from the printhead 3). Each nest lever 120 defines a cam slot 122 engaged with a respective follower pin 124 extending parallel with the pivot axis at opposite ends of the second longitudinal side bar 112. Pivoting motion of each nest lever 120 away from its respective end bar 114 moves the second longitudinal side bar 112 linearly away from the first longitudinal side bar 110, by virtue of the cam engagement between the cam slots 122 and follower pins 124, to open the nest 102. Conversely, pivoting motion of each nest lever 120 towards respective end bars 114 moves the second longitudinal side bar 112 linearly towards the first longitudinal side bar 110 to lock the nest 102 closed. Each nest lever 120 has a finger-grip portion 126 at an opposite end from the pivot axis for user actuation of the locking mechanism.

In its closed position, the nest 102 is configured to form an ink mist seal around the printhead 3. The ink mist seal inhibits the ingress of ink mist into the supply module 80 and thereby protects sensitive electronic circuitry on the PCBs 82 from fouling by any ink mist generated during printing. The ink mist seal comprises a pair of opposed first and second longitudinal lips 130 projecting inwardly towards the printhead from respective first and second longitudinal side bars 110 and 112. Each lip 130 is engaged with a longitudinal edge region 132 of the printhead 3 to form part of the ink mist seal.

Figure 12:
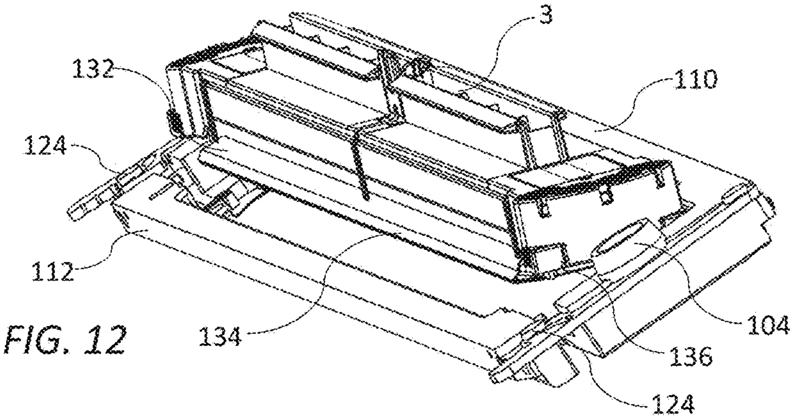
FIG. 12 is a perspective of a printhead being inserted into a nest.
Figure 14:
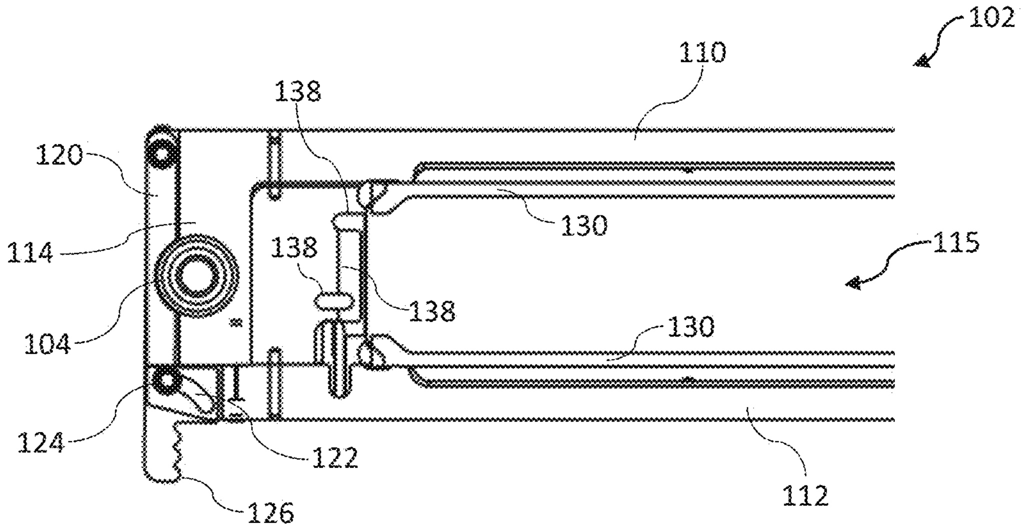
FIG. 14 is a plan view of part of the nest.

To insert the printhead 3 into the nest 102, the nest is firstly configured into its open position as shown in FIG. 13. The printhead is then laterally guided into the open nest cavity 115 at an oblique angle (FIG. 12) towards the first longitudinal side bar 110. A first longitudinal flange 134 at one side of the printhead 3 is initially held at an angle below the longitudinal lip 130 of the first longitudinal side bar 110 to overlap with the lip, and then the printhead is rotated about its longitudinal axis into a plane parallel with a plane of the nest. Printhead datums 136 at opposite ends of printhead 3 engage with complementary nest datums 138 to provide accurate and repeatable positioning of the printhead within the nest (FIG. 14).

With the printhead 3 properly positioned inside the open nest (FIG. 10), the nest levers 120 are pivoted inwards to close the second longitudinal side bar 112 and lock the nest 102 into its closed position, thereby forming the locked printhead nest assembly 100 (FIG. 9). Closure of the nest 102 moves the longitudinal lip 130 of the second longitudinal side bar 112 towards the printhead 3 to complete the ink mist seal with each longitudinal flange 134 of the printhead positioned beneath and overlapping with its respective longitudinal lip.

The complete printhead nest assembly 100 may then be secured to the printhead carrier 30 using the screw fasteners 42 as described above. For printhead removal, the reverse procedure is followed whereby the printhead nest assembly 100 is detached from the printhead carrier 30, the nest opened using the nest levers 120, and the printhead 3 removed obliquely from the open nest 102.

It will, of course, be appreciated that the present invention has been described by way of example only and that modifications of detail may be made within the scope of the invention, which is defined in the accompanying claims.

The invention claimed is:

1. An integrated inkjet module comprising:

a chassis comprising an elongate base plate and a rear wall extending upwards therefrom;

an elongate printhead liftably mounted on the chassis;

a lift mechanism operatively connected to the printhead for lifting and lowering the printhead relative to the elongate base plate;

a capping assembly slidably mounted on the elongate base plate, the capping assembly comprising a capper extending parallel with the rear wall and the printhead;

a capper movement mechanism operatively connected to the capping assembly for linearly slidably moving the capping assembly towards and away from the rear wall; and a cap cover pivotally mounted to the rear wall, wherein:

the capping assembly is slidably movable between a capping position in which the capper caps the printhead and a covered position in which the cap cover covers the capper; and engagement of part of the capping assembly with the cap cover pivots the cap cover away from the capper to allow sliding movement of the capper towards the rear wall and into the covered position.

2. The inkjet module of claim 1, wherein the cap cover is pivotally mounted to the rear wall via rocker arms at each end of the cap cover.

3. The inkjet module of claim 2, wherein the capping assembly comprises cam guides positioned at each end of the capper, each cam guide having a rear cam surface configured for camming engagement with a respective rocker arm such that sliding movement of the capping assembly towards the cap cover causes the cap cover to pivot upwards away from the capper.

4. The inkjet module of claim 3, wherein the cam guides and rocker arms have complementary profiles, such that the cap cover pivots downwards into sealing engagement with a perimeter seal of the capper when the capping assembly reaches its rearmost position.

5. The inkjet module of claim 3, wherein each cam guide has a front cam surface configured for camming engagement with a respective rocker arm such that sliding movement of the capping assembly away from the cap cover causes the cap cover to pivot upwards away from the capper.

6. The inkjet module of claim 1, wherein the cap cover comprises a rigid elongate plate.

7. The inkjet module of claim 1, wherein the capper movement mechanism comprises a rack-and-pinion mechanism.

8. The inkjet module of claim 1, wherein the capping assembly is slidably movable along capper rails extending perpendicularly away from the rear wall.

9. The inkjet module of claim 1, further comprising a wiper for wiping the printhead longitudinally in a direction perpendicular to movement of the capping assembly.

10. The inkjet module of claim 9, further comprising a wiper movement mechanism mounted on a wiper support, said wiper support being fixedly attached to the rear wall and positioned directly above the cap cover.

11. The inkjet module of claim 1, wherein the printhead is mounted on a printhead carrier, the printhead carrier being liftably mounted on the chassis via a pair of brackets slidably engaged with respective posts extending upwards from the elongate base plate.

* * * * *